United States Patent
Ibori et al.

(10) Patent No.: US 8,378,599 B2
(45) Date of Patent: *Feb. 19, 2013

(54) POWER TRANSDUCER

(75) Inventors: Satoshi Ibori, Yachimata (JP); Yoshihiro Uchino, Yachiyo (JP); Hiroshi Watanabe, Sakura (JP); Masahiro Hiraga, Yotsukaido (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/357,104

(22) Filed: Jan. 24, 2012

(65) Prior Publication Data

US 2012/0119685 A1 May 17, 2012

Related U.S. Application Data

(63) Continuation of application No. 12/370,087, filed on Feb. 12, 2009, now Pat. No. 8,120,294.

(30) Foreign Application Priority Data

Mar. 10, 2008 (JP) ................................ 2008-058918

(51) Int. Cl.
*H02P 3/00* (2006.01)

(52) U.S. Cl. ............................ 318/375; 318/376; 363/34

(58) Field of Classification Search .................. 318/139, 318/800, 801, 803, 375, 376
See application file for complete search history.

(56) References Cited

U.S. PATENT DOCUMENTS

| | | | |
|---|---|---|---|
| 4,845,418 A | 7/1989 | Conner | |
| 4,879,639 A | 11/1989 | Tsukahara | |
| 5,077,652 A * | 12/1991 | Faley | 363/97 |
| 6,175,217 B1 * | 1/2001 | Da Ponte et al. | 322/19 |
| 6,227,961 B1 | 5/2001 | Moore et al. | |
| 6,686,718 B2 * | 2/2004 | Jadric et al. | 318/801 |
| 6,815,639 B2 * | 11/2004 | Geissler | 219/130.1 |
| 7,057,361 B2 * | 6/2006 | Kitahata et al. | 318/139 |
| 7,618,566 B2 * | 11/2009 | Pilavdzic | 264/40.6 |
| 7,746,039 B2 | 6/2010 | Hoffmann et al. | |

FOREIGN PATENT DOCUMENTS

| | | |
|---|---|---|
| JP | 62-025885 | 2/1987 |
| JP | 3-036974 | 2/1991 |
| JP | 3-060389 | 3/1991 |
| JP | 5-168287 | 7/1993 |
| JP | 10-229607 | 8/1998 |
| JP | 11-069828 | 1/1999 |
| JP | 2001-072387 | 3/2001 |
| JP | 2001-086764 | 3/2001 |
| JP | 3648932 | 2/2005 |
| JP | 2005-229771 | 8/2005 |
| JP | 2005-253200 | 9/2005 |

* cited by examiner

*Primary Examiner* — Rina Duda
(74) *Attorney, Agent, or Firm* — Mattingly & Malur, PC (57) ABSTRACT

The performance of a power transducer is improved while efficiently using a power semiconductor also by managing the permissible duty factor of the power semiconductor in the regenerative braking circuit provided in the power transducer. The user is allowed to set, through an operation panel provided on the power transducer, the resistance value of the regenerative braking resistor for thermally consuming the rotational energy generated during motor deceleration. The power transducer performs the steps of: calculating the current which flows in the regenerative braking circuit from the resistance value setting; obtaining the generation loss of the power semiconductor in the regenerative braking circuit with the calculated current value; and determining the permissible duty factor of the power semiconductor from the obtained generation loss.

10 Claims, 6 Drawing Sheets

| INPUT VALUE OF REGENERATIVE BRAKING RESISTOR | DUTY FACTOR OF REGENERATIVE BRAKING CIRCUIT |
|---|---|
| RESISTANCE VALUE (Ω) | IGBT %ED$_{PM}$ |
| 1.0 | 2.0 |
| 1.2 | 2.1 |
| 1.4 | 2.2 |
| ⋮ | ⋮ |
| 3.6 | 3.3 |
| ⋮ | ⋮ |
| 100 | 80.0 |
| ⋮ | ⋮ |

FIG. 5

| INPUT VALUE OF BRAKING RESISTOR ||
| --- | --- |
| %ED$_R$ | RESISTANCE VALUE ($\Omega$) |
| 20.0 | 3.6 |

FIG. 6

POWER TRANSDUCER

CROSS-REFERENCES

This is a continuation application of U.S. Ser. No. 12/370,087, filed Feb. 12, 2009 (now U.S. Pat. No. 8,120,294), the entire disclosure of which is hereby incorporated by reference.

CLAIM OF PRIORITY

The present application claims priority from Japanese application serial no. JP2008-058918, field on Mar. 10, 2008, the content of which is hereby incorporated by reference into this application.

BACKGROUND OF THE INVENTION

1. Field of the Invention

The present invention relates to a power transducer.

2. Description of the Related Art

Inverters, a form of electrical power transducer, have been widely adopted in industries and also used in household electric appliances as rotational velocity control devices for AC motors. When the rotor of an AC motor is decelerated, the rotational energy of the AC motor during the deceleration is accumulated as electrostatic energy in a smoothing capacitor located in the DC intermediate circuit of its transducer. However, voltages may increase at both ends of the smoothing capacitor due to its small capacitance. This puts into operation the overvoltage protection circuit provided in the DC intermediate circuit of the transducer, bringing the transducer to a halt.

For this reason, a power transducer is provided with a regenerative braking resistor in its DC intermediate circuit so that the regenerative braking resistor consumes the deceleration rotational energy of the AC motor as thermal energy.

The rated currents of the regenerative braking resistor and of power semiconductors in the regenerative braking circuit have upper limits. If used beyond the limits, the regenerative braking resistor and the power semiconductors receive extremely high voltages: they may be thermally damaged due to electrical heat generation. Thus, a maximum duty factor, a quantitative attribute, is predefined for the regenerative braking resistor (the maximum duty factor is hereinafter referred to as % ED).

Therefore, the power transducer manages the cumulative operating time of the regenerative braking circuit provided in its DC intermediate circuit. When the cumulative operating time percentage exceeds the % ED of the regenerative braking resistor, the power transducer disconnects a switching element in the regenerative braking circuit provided in the DC intermediate circuit to cut off the current flowing in the regenerative braking resistor, thus protecting the regenerative braking resistor from thermal destruction due to electrical heat generation.

However, no strict definition has been given to the permissible duty factor % $ED_{pm}$ of the power semiconductor (as a switching element) of the regenerative braking circuit provided in the DC intermediate circuit in the power transducer. Only the % $ED_R$ is determined based mainly on the correlation with the regenerative braking resistor.

A power semiconductor used for the power transducer, such as IGBT, generates heat because of electrical loss generated during electric power conversion. Therefore, operating the power transducer beyond the semiconductor's operating limit temperature may result in thermal destruction and deactivation. Therefore, the power transducer includes a cooling fin and a cooling fan for cooling the power semiconductor. Heat is conducted from the power semiconductor to the cooling fin, and the cooling fan sends air to the cooling fin for thermal exchange to allow heat radiation.

Paragraph 0007 of Japanese Patent No. 3648932 describes that the voltage-type power transducer comprises: a series circuit connected at both ends of the smoothing capacitor, the series circuit consisting of a braking resistor and a transistor switch; a voltage detecting circuit which closes the switch when the voltage at both ends of the smoothing capacitor exceeds a predetermined value; a totalizing circuit which totalizes time intervals during which the switch is closed within a predetermined time period (T) based on a start command from outside, and outputs the total time ($\Sigma t$); a usage rate calculation circuit which calculates the usage rate (X %: X=($\Sigma t/T$)*100) of the braking resistor from the predetermined time period (T) and total time ($\Sigma t$); and a display circuit which displays the usage rate (X %) when the predetermined time period (T) has elapsed.

Further, JP-A-5-168287 and JP-A-10-229607 describe that overload protection and overheat protection are performed for the regenerative braking resistor.

SUMMARY OF THE INVENTION

According to the description of the above-mentioned conventional technique, although overload protection and overheat protection are performed by managing the permissible duty factor % ED of the regenerative braking resistor, no consideration is given to % ED management for the power semiconductor in the regenerative braking circuit. Therefore, the power semiconductor generates heat because of loss electrically generated during electric power conversion and, operating the power transducer beyond the semiconductor's operating limit temperature may result in thermal destruction and deactivation. No consideration has been given to this problem.

An object of the present invention is to improve the performance of the power transducer while efficiently using the power semiconductor also by managing the permissible duty factor % ED of the power semiconductor in the regenerative braking circuit provided in the power transducer.

In order to attain the above object, the present invention specifically provides a power transducer which outputs AC power having a variable voltage and a variable frequency, the power transducer comprising: a converter which rectifies the AC voltage of the AC power supply to convert it to a DC voltage; a DC intermediate circuit having a smoothing capacitor for smoothing the DC voltage of the converter; a detecting circuit which detects the voltage of the DC intermediate circuit; a regenerative braking circuit provided in the DC intermediate circuit; a timer which accumulates the operating time of the regenerative braking circuit to obtain its cumulative operating time; and an inverter which converts the DC voltage of the converter to an AC voltage. It is made possible to individually set the permission duty factor % ED and resistance value R of the regenerative braking resistor connected to the regenerative braking circuit included in the DC intermediate circuit.

Further, more desirable specific modes according to the above-mentioned aspect are shown below.

(1) Includes an operation panel for setting the % $ED_R$ and resistance value R of the regenerative braking resistor, and a display unit is provided on the operation panel.

(2) Includes a nonvolatile memory for storing correlation data of the % $ED_{pm}$ of the power semiconductor in the regenerative braking circuit corresponding to the resistance value R of the regenerative braking resistor obtained in advance through calculation.

(3) The % $ED_{pm}$ of the power semiconductor in the regenerative braking circuit corresponding to the resistance value setting R of the regenerative braking resistor can be read from the nonvolatile memory.

(4) Includes a drive circuit for activating the regenerative braking circuit when the voltage detected by the detecting circuit reaches or exceeds a specified voltage.

(5) Includes a timer which accumulates the operating time (t) of the regenerative braking circuit to obtain its cumulative operating time (Σt).

(6) When the cumulative operating time percentage (Σt/T*100) obtained by the timer reaches the % $ED_R$ of the regenerative braking resistor or the % $ED_{pm}$ of the power semiconductor in the regenerative braking circuit, whichever smaller, only the regenerative braking circuit is disconnected without breaking the output of the power transducer.

(7) The cumulative operating time obtained by the timer is automatically cleared (to zero) after a specified time T has elapsed.

(8) When only the regenerative braking circuit is disconnected, the failure is displayed on the display unit of the operation panel.

In accordance with the present invention, it becomes possible to manage the permissible duty factor % ED of the power semiconductor in the regenerative braking circuit provided in the power transducer, thus improving the performance of the power transducer while efficiently using the power semiconductor in the regenerative braking circuit.

DETAILED DESCRIPTION OF THE PREFERRED EMBODIMENTS

Specific embodiments of the present invention will be explained below with reference to FIGS. 1 to 6. However, the present invention is not limited to the accompanying drawings.

First Embodiment

Figure 1:
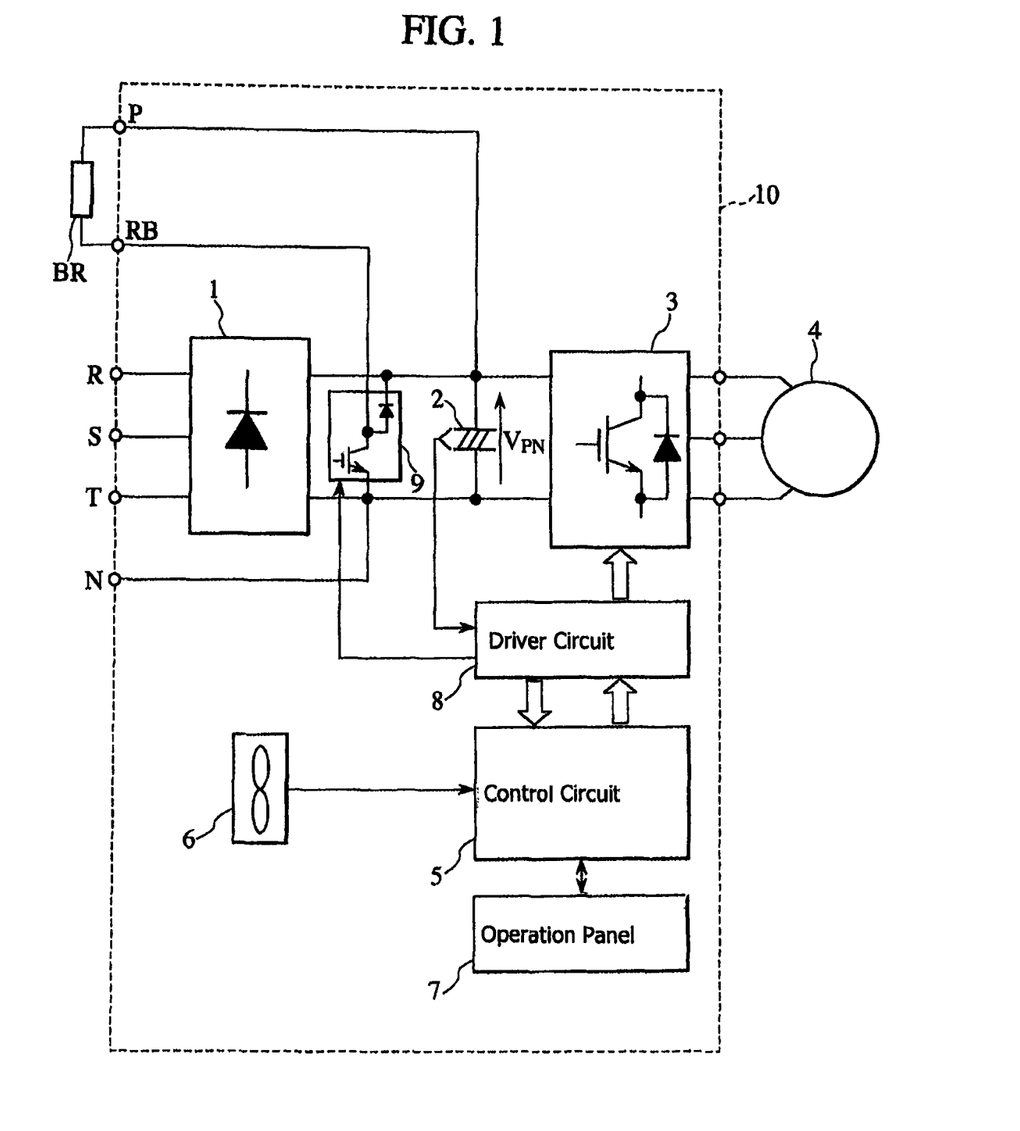
FIG. 1 is a schematic view of a main circuit configuration of a power transducer.

FIG. 1 is a schematic view showing the circuit configuration of a power transducer according to the present embodiment. The power transducer 10 includes: a converter 1 which converts AC power to DC power; a smoothing capacitor 2 located in the DC intermediate circuit of the power transducer 10; an inverter 3 which inverts DC power to AC power at an arbitrary frequency; and an AC motor 4.

The power transducer 10 further includes: a cooling fan 6 which cools the converter and a power module in the inverter; and a digital operation panel 7 used to set and change various control data of the power transducer, and display and monitor abnormal states.

The power transducer 10 further includes a control circuit 5 which includes a microcomputer (control and calculation unit) to control a switching element of the inverter and at the same time performs total control of the power transducer, thus allowing required control processing based on various control data input through the digital operation panel 7. The control circuit 5 controls the switching element of the inverter 3 based on various control data input through the digital operation panel 7, and performs control processing required for the entire power transducer.

Although the internal configuration is omitted, the power transducer also includes a microcomputer (control and calculation unit) which performs calculation based on the information from the data stored in the storage unit for storing various control data. The power transducer 10 further includes a driver circuit 8 which drives the switching element of the inverter. The driver circuit 8 drives the switching element of the inverter 3 and the switching element in the regenerative braking circuit 9 based on a command from the control circuit 5. When the detection value of a voltage $V_{PN}$ detecting circuit of the DC intermediate circuit reaches or exceeds a specified voltage, the driver circuit 8 drives the switching element in the regenerative braking circuit 9. Further, the microcomputer included in the control circuit 5 accumulates the operating time of the regenerative braking circuit by means of the timer to obtain the cumulative operating time.

When the cumulative operating time percentage obtained by the timer exceeds a specified % ED, the microcomputer deactivates only the regenerative braking circuit without breaking the output of the power transducer, and displays the failure on the digital operation panel 7. Further, the driver circuit 8 includes a switching regulator circuit (DC/DC converter) to generate DC voltages required for the operation of power transducer, and supply each DC voltage to each component. The power transducer 10 further includes a regenerative braking circuit 9 in the DC intermediate circuit.

The regenerative braking circuit 9 includes an IGBT which is a typical switching element. Needless to say, this element is not limited to an IGBT and may be any element having a function of a switching element. A regenerative braking resistor BR thermally consumes the rotational energy generated during AC motor deceleration.

Since the rated current of the IGBT included in the regenerative braking circuit 9 has an upper limit, the minimum permissible resistance value Rmin of the regenerative braking resistor BR connectable to the regenerative braking circuit is predetermined as a product specification for each capacity of the power transducer in order to prevent the IGBT from being destroyed. The minimum permissible resistance value Rmin is often listed in the product catalogs and operation manuals of power transducers.

Various control data of the power transducer can be set and changed from the operation panel 7. The operation panel 7 includes a display unit capable of failure display. When a failure is detected in the power transducer, it is displayed on the display unit. Although the operation panel 7 in the present embodiment is not limited to a certain type, the operator can perform its operation as a digital operation panel while monitoring the display unit in consideration of the operability for the user of the power transducer.

Although the display unit is not necessarily built in the operation panel 7, it is desirable that the display unit be incorporated in the operation panel 7 to allow the operator of the operation panel 7 to perform operations while monitoring the display.

Various control data of the power transducer input from the operation panel 7 are stored in a storage unit (not shown). Detailed explanation of an power transducer which is a power transducer will be omitted since it is well-known technology.

Figure 2:
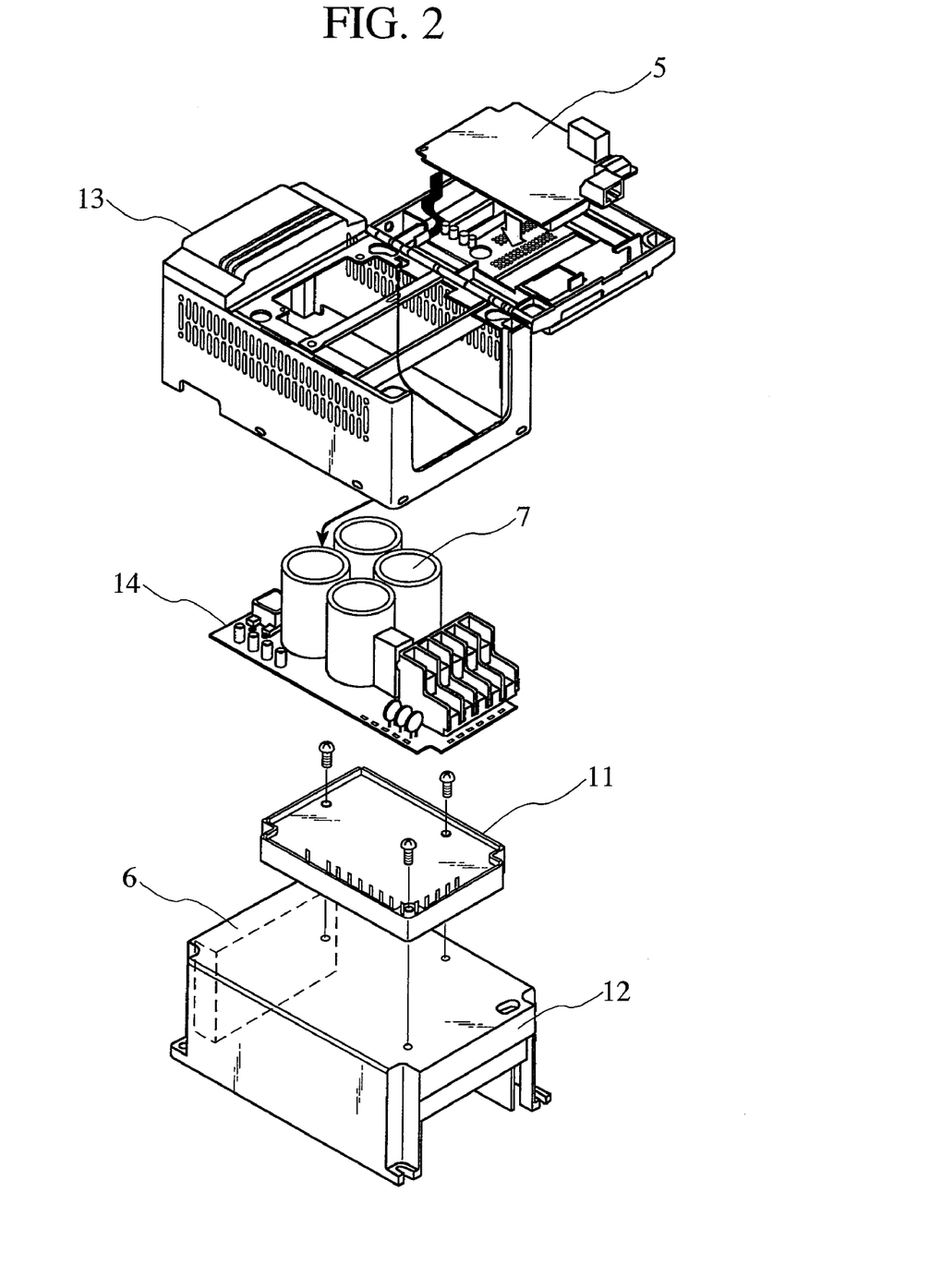
FIG. 2 is a diagram showing an example layout of main circuit components of the power transducer.

FIG. 2 is an example layout of main circuit components of the power transducer. The power semiconductor 11 is a combined module which includes the converter 1, the inverter 3, and the regenerative braking circuit 9. The power transducer 10 further includes a cooling fin 12 and a cooling fan 6 to cool the power semiconductor 11 configured as a combined module. Heat is conducted from the power semiconductor 11 (heat generating apparatus) to the cooling fin 12, and the cooling fan 6 sends air to the cooling fin 12 for thermal exchange to allow heat radiation.

The power transducer 10 further includes a main circuit substrate 14 and a resin mold case 13. The power semiconductor 11 configured as a combined module further includes a temperature detector to detect the temperature in the power module. This temperature detector is composed of a thermistor whose resistance value changes with the temperature.

Figure 3:
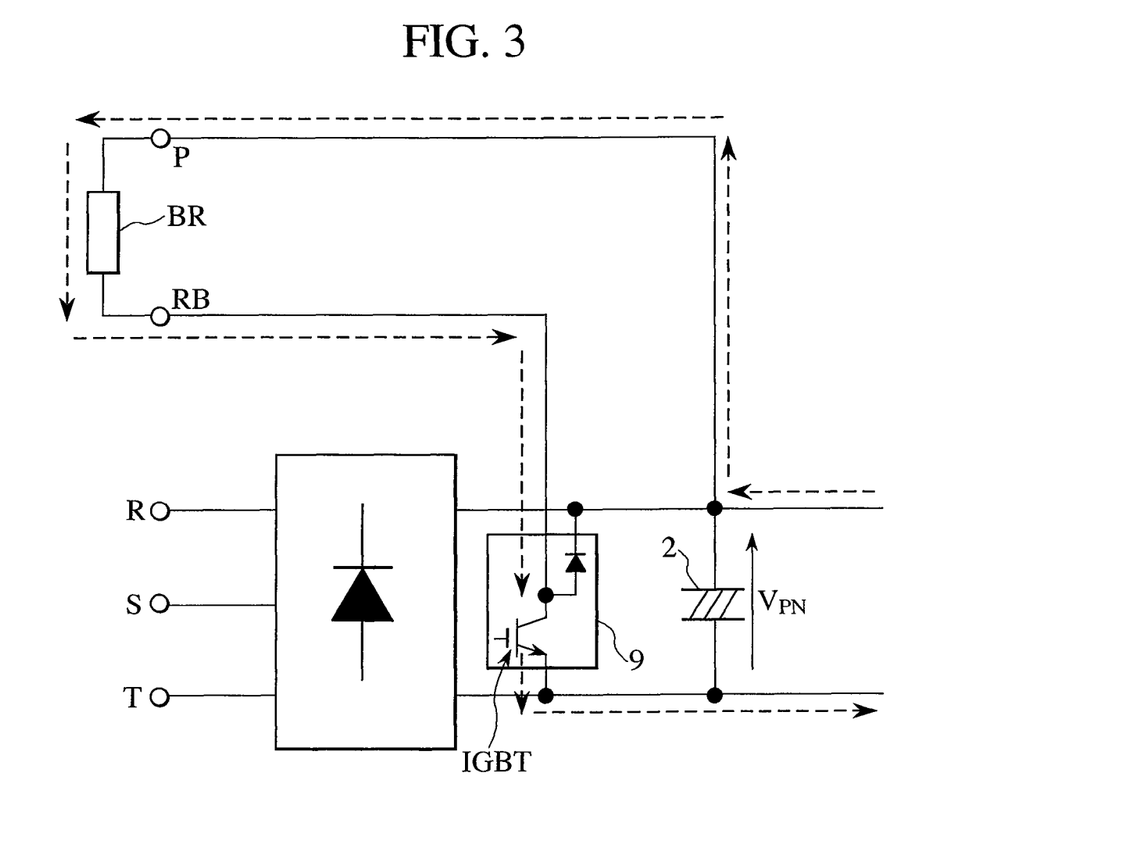
FIG. 3 is a diagram showing the route of a current flowing in a regenerative braking circuit.

FIG. 3 is a diagram showing the route of a current flowing in the regenerative braking circuit 9 during operation. When the AC motor 4 driven by the power transducer 10 is decelerated, the rotational energy is fed back to the smoothing capacitor 2 in the power transducer which is a power supply because of the inertia of the AC motor which is a body of revolution. In this case, the smoothing capacitor 2 accumulates the rotational energy as electrostatic energy. The power transducer is provided with the overvoltage protection function. With large rotational energy, the voltage $V_{PN}$ at both ends of the smoothing capacitor increases. When the detection value of the voltage $V_{PN}$ reaches or exceeds a specified voltage $V_{pnd0}$, this function disconnects the output of the power transducer to protect the smoothing capacitor 2 from overvoltage.

Therefore, in order to avoid the operation of the overvoltage protection function, the power transducer is provided with the regenerative braking circuit 9 so that the rotational energy generated during AC motor deceleration is thermally consumed by the regenerative braking resistor BR. Dotted lines of FIG. 3 show the route of the current which flows in the regenerative braking circuit 9 so that the rotational energy generated during AC motor deceleration is thermally consumed by the regenerative braking resistor BR.

The operation of the regenerative braking circuit will be explained below. The regenerative braking circuit constantly detects and monitors the voltage $V_{PN}$ at both ends of the smoothing capacitor 2 in the DC intermediate circuit and, when the detection value of the voltage $V_{PND}$ reaches or exceeds a specified voltage $V_{pnd1}$, the IGBT (switching element) in the regenerative braking circuit 9 is driven by the driver circuit 8. Further, when the detection value of the voltage $V_{PND}$ falls below a specified voltage $V_{pnd2}$, the IGBT (switching element) in the regenerative braking circuit 9 is disconnected by the driver circuit 8. In this case, the cumulative operating time of the regenerative braking circuit is obtained by the timer.

Here, detection voltages $V_{pnd0}$, $V_{pnd1}$ and $V_{pnd2}$ of the voltage detecting circuit provided in the DC intermediate circuit constantly satisfy a condition $V_{pnd0} > V_{Vpnd1} > V_{pnd2}$. Although the rotational energy generated during AC motor deceleration is thermally consumed by the regenerative braking resistor BR, the regenerative braking resistor BR cannot thermally consume infinite energy. Since the regenerative braking resistor consumes the rotational energy of the AC motor by converting it to thermal energy, operating the power transducer beyond the semiconductor's operating limit temperature may result in burnout or fire due to abnormal heat generation.

Needless to say, the energy is represented by the product of the power consumption and time ($V_{pnd}^2/R*t$). That is, how long the power consumption ($V_{pnd}^2/R$) can be permitted is determined by the specification of the regenerative braking resistor. A percentage obtained by dividing the permissible accumulative application time ($\Sigma t$) by a predetermined time period (T) equals the % ED (% ED=$\Sigma t/T*100$).

This means that, for example, when the permissible duty factor of the regenerative braking resistor is 5% ED and the time period (T) is 100 seconds, the power can be applied for five seconds (5/100*100) as accumulative application time. In this way, power transducer makers sell as an option regenerative braking resistors having predetermined resistance and % ED values as specifications.

Specifically, when a maker genuine regenerative braking resistor is purchased, the resistor cannot be used beyond the specified % ED. Since the number of resistance values (% ED specifications) of the maker genuine regenerative braking resistor is limited, the maker offers limited number of types of regenerative braking resistors.

Accordingly, there are many cases when the user designs the resistance and % ED values of the regenerative braking resistor suitable for mechanical system operation and, if a maker genuine part is not available, request a specialized resistor producer to produce the resistor. In this case, the user must design a regenerative braking resistor BR having a minimum permissible resistance value (Rmin) equal to or larger than that described in the product catalog and operation manual of the power transducer.

If the resistance value of the designed regenerative braking resistor BR satisfying the minimum permissible resistance value (Rmin) is not found in maker genuine parts, it is necessary that the regenerative braking resistor BRA requested to the specialized resistor producer or another braking resistor BRB stored by the user be connected to the regenerative braking circuit. In this case, in order to protect the regenerative braking resistor BR from electrical heat generation, the user must set the permissible duty factor % $ED_R$ of the regenerative braking resistor through the digital operation panel 7.

This situation, however, causes a problem that the user cannot determine the permissible duty factor % $ED_{pm}$ of the IGBT included in the regenerative braking circuit with the resistance value R of the regenerative braking resistor BRA or BRB, or whether or not the setting of the permissible duty factor % $ED_R$ of the regenerative braking resistor is thermally acceptable.

Therefore, the user is allowed to set, through the digital operation panel 7, the permissible duty factor % $ED_R$ and resistance value R of the new regenerative braking resistor designed by the user. This configuration makes it possible to easily obtain from the following formula 1 a current I which flows in the IGBT included in the regenerative braking circuit based on the resistance value R of the regenerative braking resistor set through the digital operation panel 7 by the user.

$$I = V_{PND}/R \quad \text{(Formula 1)}$$

where $V_{PND}$ is the detection value of the voltage $V_{PN}$ of the DC intermediate circuit, and is a predetermined voltage ($V_{PND}=V_{pnd1}$) for driving the switching element in the regenerative braking circuit 9. The microcomputer (control and calculation unit) included in the control circuit 5 performs the steps of: calculating the current I by using the above-mentioned formula; calculating the generation loss of the IGBT included in the regenerative braking circuit 9 based on the calculated current I; and obtaining the permissible duty factor % $ED_{pm}$ of the IGBT.

Generally, the generation loss P of the IGBT is represented by the following formula 2.

$$P = Pon + Poff + Psat \quad \text{(Formula 2)}$$

where Pon denotes the ON loss when the IGBT (power semiconductor) changes from the OFF state to the ON state, Poff denotes the OFF loss when it changes from ON state to the OFF state, and Psat the steady loss.

A detailed formula for the generation loss P will be omitted since it is disclosed in semiconductor maker's application note or the like and therefore well-known.

The detailed formula for the generation loss of the power semiconductor is prestored in a nonvolatile memory. The microcomputer performs the steps of: calculating a current ($I = V_{PND}/R$) which flows in the IGBT included in the regenerative braking circuit from the resistance value setting R of the regenerative braking resistor; calculating the generation loss of the IGBT by using the formula stored in the memory; obtaining the permissible duty factor % $ED_{pm}$ of the IGBT from the calculated operation loss; and displaying it on the digital operation panel 7.

The microcomputer compares the permissible duty factor % $ED_R$ of the regenerative braking resistor set through the digital operation panel 7 by the user with the permissible duty factor % $ED_{pm}$ of the IGBT included in the regenerative braking circuit obtained from the resistance value setting R of the regenerative braking resistor. When the cumulative operating time percentage ($\Sigma t/T*100$) obtained by the timer reaches the % $ED_R$ of the regenerative braking resistor or the % $ED_{pm}$ of the power semiconductor, whichever smaller, the microcomputer automatically disconnects only the power semiconductor in the regenerative braking circuit without breaking the output of the power transducer.

In this case, when the resistance value setting R of the regenerative braking resistor is equal to or less than the minimum permissible resistance value (data stored in a storage unit not shown) predetermined for each capacity of the power transducer, the permissible duty factor of the IGBT is displayed as 0% ED on the digital operation panel 7. The permissible duty factor % $ED_{pm}$ of the IGBT is displayed on the digital operation panel 7 aiming at notifying whether or not the resistance value R of the regenerative braking resistor set by the user is acceptable. The display is not necessarily 0% ED. Neither 0 display nor 0% display impairs the intention of the present invention.

For example, it is possible either to clearly display an incorrect resistance value setting or display NG-R which means an incorrect resistance value setting. The display contents are not limited as long as its meaning can be recognized by the operator of the power transducer.

Since displaying results on the digital operation panel 7 in this way allows the operator to recognize various settings, the operator can clearly judge the situation from the display contents.

In this case, the permissible duty factor % $ED_{pm}$ of the IGBT included in the regenerative braking circuit 9 obtained from the resistance value setting R of the regenerative braking resistor is smaller than the % $ED_R$ of the regenerative braking resistor and becomes 0%. This means that the regenerative braking circuit does not operate at all. This phenomenon occurs because the selected resistance value R of the regenerative braking resistor is equal to or less than the minimum permissible resistance value Rmin predetermined for each capacity of the power transducer. This function is aimed at the prevention of destruction of the IGBT included in the regenerative braking circuit 9.

Figure 4:
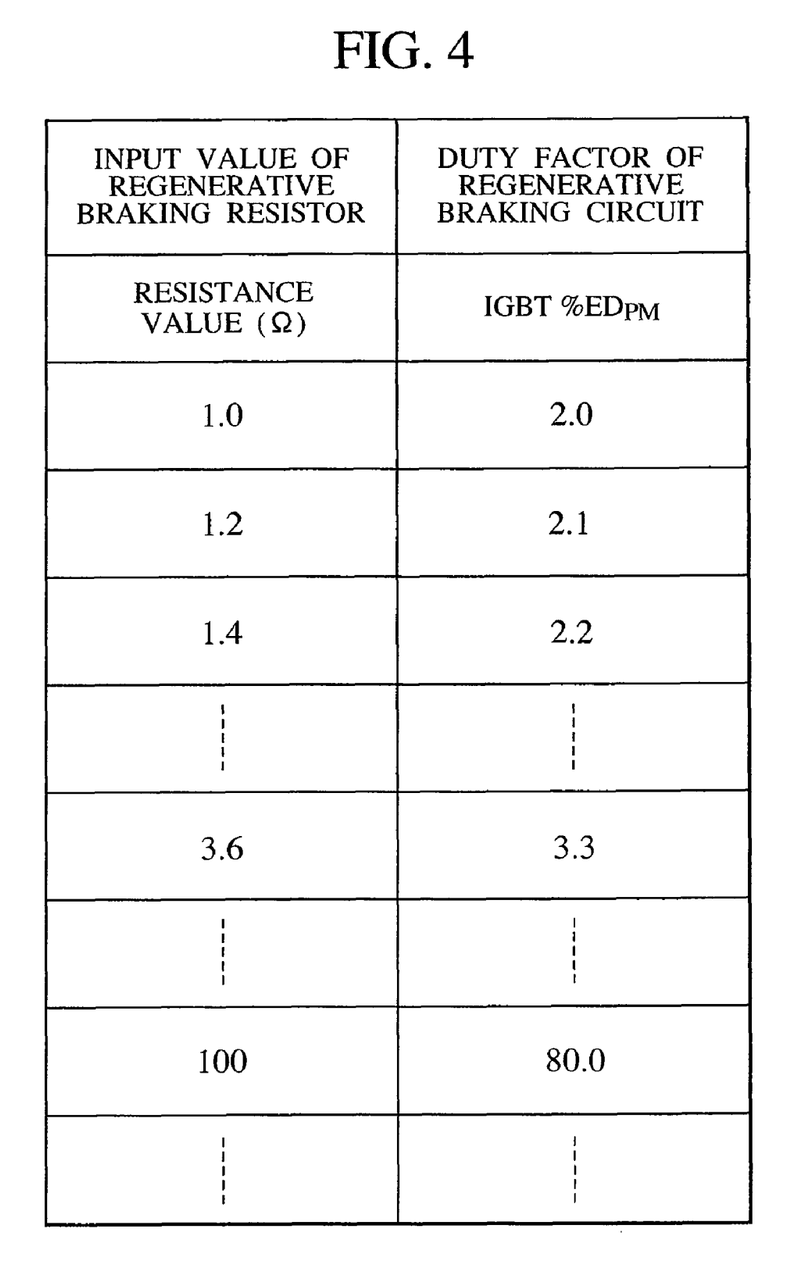
FIG. 4 is a diagram showing example correlation data between the resistance value setting and the permissible duty factor % ED of the IGBT in the regenerative braking circuit, the data being stored in a nonvolatile memory.

FIG. 4 shows another embodiment which performs the steps of: calculating correlation data of the permissible duty factor % $ED_{pm}$ of the IGBT in the regenerative braking circuit corresponding to the resistance value R of the regenerative braking resistor; storing the calculation result in the nonvolatile memory; and reading the data from this memory.

The loss calculation simulation software for the generation loss P of the power semiconductor can also be downloaded at the websites of power semiconductor makers.

The use of this simulation software makes it easier to obtain the current $I = V_{PND}/R$ which flows in the power semiconductor from the resistance value setting R of the regenerative braking resistor, calculate the generation loss P of the power semiconductor under any given operating conditions, and obtain in advance the permissible duty factor % EDM of the IGBT corresponding to the resistance value setting R from the calculated generation loss.

FIG. 4 shows an example correlation data between the resistance value setting R of the regenerative braking resistor and the permissible duty factor % $ED_{pm}$ of the IGBT in the regenerative braking circuit, the data being stored in the nonvolatile memory. Although the data is stored in memory as binary numbers, the data is represented by decimal numbers for easier understanding. This does not impair the intention of the present invention. Further, each numerical value described is merely an example and is not limited thereto.

The correlation data between the resistance value setting R of the regenerative braking resistor and the permissible duty factor % $ED_{pm}$ of the IGBT in the regenerative braking circuit is prestored in the nonvolatile memory. The permissible duty factor % $ED_{pm}$ of the IGBT corresponding to the resistance value setting R of the regenerative braking resistor is read from the nonvolatile memory.

Judging by the load factor of the microcomputer, it is not realistic that the microcomputer calculates the complicated generation loss of the power semiconductor. It is more realistic that the microcomputer stores in the nonvolatile memory the correlation data between the resistance value setting R of the regenerative braking resistor and the permissible duty factor % $ED_{pm}$ of the IGBT in the regenerative braking circuit, and reads from the nonvolatile memory the permissible duty factor % $ED_{pm}$ of the IGBT corresponding to the resistance value setting R of the regenerative braking resistor.

Figure 5:
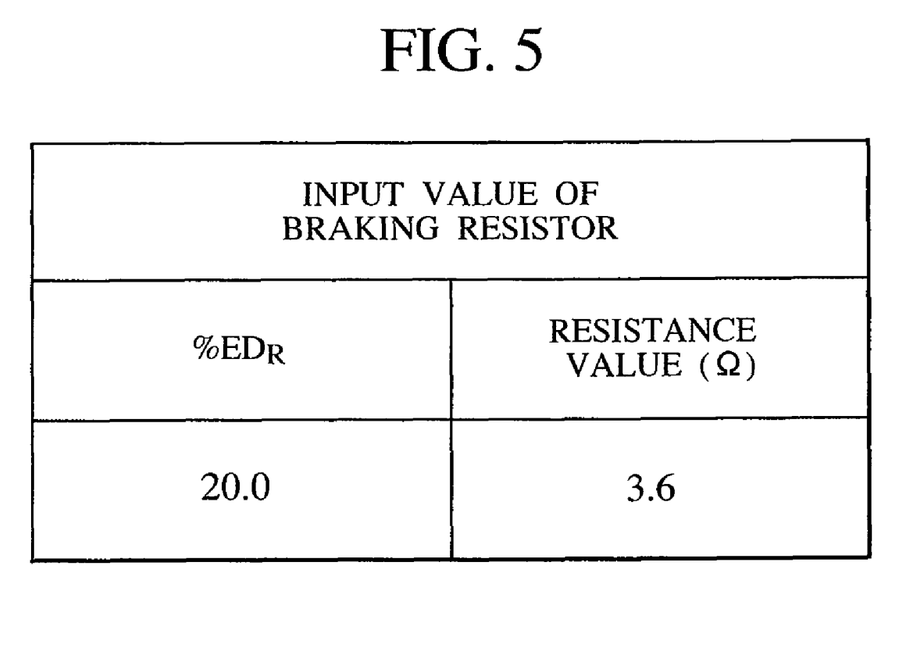
FIG. 5 is a diagram showing example % $ED_R$ and resistance value settings of a regenerative braking resistor.

FIG. 5 shows example % $ED_R$ and resistance value R of the regenerative braking resistor BR set through the digital operation panel 7 by the user. Although the regenerative braking resistor set by the user has a % $ED_R$ (20.0/resistance value R) of 3.6 ohms, The permissible duty factor % $ED_{pm}$ of the IGBT in the regenerative braking circuit corresponding to the resistance value is the value read from the nonvolatile memory of FIG. 4, that is, % $ED_{pm} = 3.3$.

In this case, the microcomputer in the control circuit compares % $ED_R = 20.0$ of the regenerative braking resistor with the permissible duty factor % $ED_{pm} = 3.3$ of the IGBT in the regenerative braking circuit read from the nonvolatile memory. When the cumulative operating time percentage ($\Sigma t/T*100$) of the control circuit reaches one of the two values (% $ED_R = 20.0$ and % $ED_{pm} = 3.3$), whichever smaller, i.e., when $\Sigma t/T*100$ reaches % $ED_{pm} = 3.3$, the microcomputer deactivates only the regenerative braking circuit and then displays the failure on the digital operation panel 7.

Figure 6:
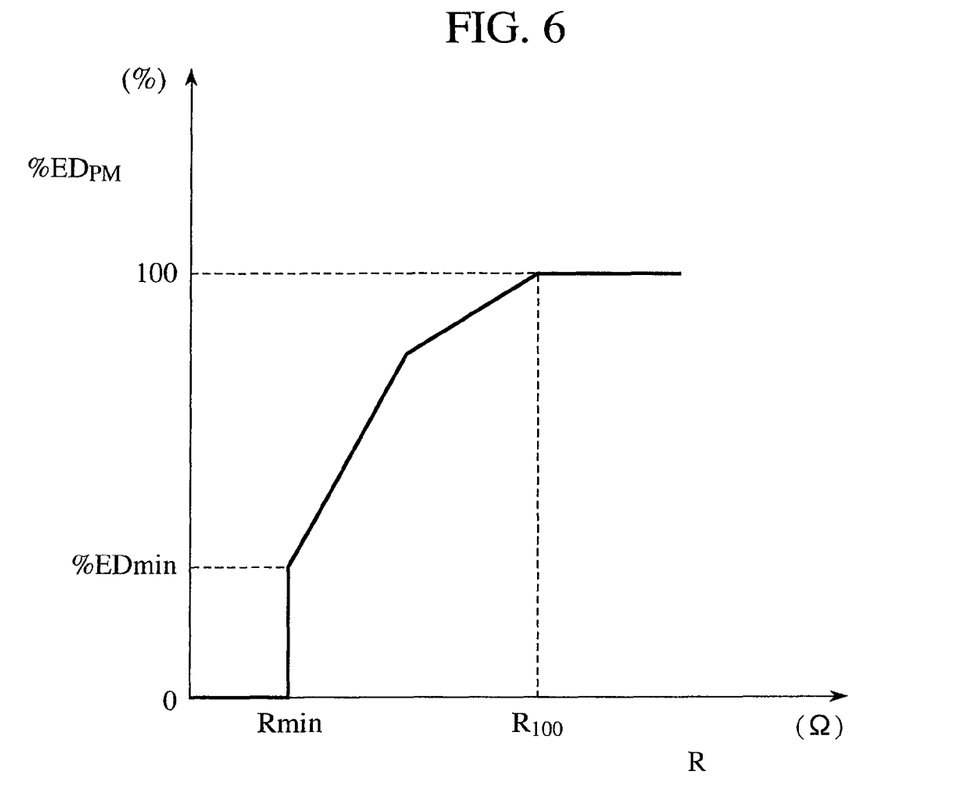
FIG. 6 is a diagram showing a correction between the resistance value setting R and the permissible duty factor % ED of the IGBT in the regenerative braking circuit.

FIG. 6 shows example correlation between the resistance value setting R of the regenerative braking resistor and the permissible duty factor % $ED_{pm}$ of the IGBT in the regenerative braking circuit. The data curving line value of the correlation diagram is stored in the nonvolatile memory.

The horizontal axis is assigned the resistance value setting R of the regenerative braking resistor, and the vertical axis the permissible duty factor % $ED_{pm}$ of the IGBT in the regenerative braking circuit. With the minimum permissible resistance value Rmin of the regenerative braking resistor, the permissible duty factor % $ED_{pm}$ of the IGBT is % EDmin; with a resistance value less than Rmin, the permissible duty factor % $ED_{pm}$ of the IGBT is 0%. This means that the IGBT in the regenerative braking circuit cannot operate with a resistance value less than the minimum permissible resistance value Rmin.

Further, when the resistance value is $R_{100}$, the permissible duty factor % $ED_{pm}$ of the IGBT is 100%. This means that the IGBT in the regenerative braking circuit can continuously operate when the resistance value R is equal to or larger than $R_{100}$.

In FIG. 6, although the relation between the resistance value setting R of the regenerative braking resistor and the permissible usage rate % $ED_{pm}$ of the IGBT in the regenerative braking circuit is approximated to a primary curve, it may be an n-th order curve. This does not impair the intention of the present invention.

In accordance with the present invention, the % $ED_R$ and resistance value R of the regenerative braking resistor BR are set through the digital operation panel 7; the permissible duty factor % $ED_{pm}$ of the IGBT in the regenerative braking circuit corresponding to the resistance value setting R is automatically read and displayed on the digital operation panel 7; when the cumulative operating time percentage (Σt/T) of the control circuit reaches one of the two values (% $ED_R$ and % $ED_{pm}$), whichever smaller, only the regenerative braking circuit is deactivated; and the failure is displayed on the digital operation panel 7. Therefore, it becomes possible to manage the permissible duty factor % $ED_{pm}$ of the IGBT (power semiconductor) in the regenerative braking circuit, thus improving the performance of the power transducer while efficiently using the power semiconductor in the regenerative braking circuit.

What is claimed is:

1. A power transducer which outputs alternating current (AC) power having a variable voltage and a variable frequency, the power transducer comprising:
a converter for rectifying an AC voltage of an AC power supply to convert it to a direct current (DC) voltage;
a DC intermediate circuit having a smoothing capacitor for smoothing the DC voltage of the converter;
a detecting circuit for detecting a voltage of the DC intermediate circuit;
a regenerative braking circuit disposed in the DC intermediate circuit;
a drive circuit for driving the regenerative braking circuit when the detecting circuit detects a specified voltage;
a timer for accumulating an operating time of the regenerative braking circuit to obtain a cumulative operating time;
an inverter for converting the DC voltage of the converter to an AC voltage; and
a display unit for displaying a permissible duty factor of a power semiconductor calculated or read from a nonvolatile memory,
wherein a permissible duty factor and a resistance value of a regenerative braking resistor connected to the regenerative braking circuit of the DC intermediate circuit are individually set,
wherein the power transducer performs the steps of:
calculating a value of current which flows in the power semiconductor, which is a switching element, in the regenerative braking circuit from the resistance value set for the regenerative braking resistor;
obtaining a generation loss of the power semiconductor from the calculated current value, and
calculating a permissible duty factor of the power semiconductor; and
determining that the regenerative braking circuit can continuously operate when both the set permissible duty factor of a regenerative braking resistor and the calculated permissible duty factor of the power semiconductor are 100% or more.

2. The power transducer according to claim 1,
wherein the power transducer performs the steps of:
comparing the permissible duty factor of the regenerative braking resistor with the permissible duty factor of the power semiconductor obtained from the resistance value set for the regenerative braking resistor, and;
automatically disconnecting only the power semiconductor in the regenerative braking circuit without breaking the output of the power transducer when the cumulative operating time obtained by the timer reaches the permissible duty factor of the regenerative braking resistor or the permissible duty factor of the power semiconductor, whichever is smaller.

3. The power transducer according to claim 1,
wherein, when the resistance value setting of the regenerative braking resistor is equal to or less than a predetermined minimum permissible resistance value, the permissible duty factor of a power semiconductor in the regenerative braking circuit is displayed on the display unit.

4. The power transducer according to claim 1,
wherein, when the resistance value setting of the regenerative braking resistor is equal to or less than a predetermined minimum permissible resistance value, symbols or characters for indicating a resistance value setting failure are displayed on the display unit.

5. The power transducer given in claim 1, further comprising:
an operation panel which allows the operator to individually set the permissible duty factor and resistance value of the regenerative braking resistor.

6. A power transducer which outputs alternating current (AC) power having a variable voltage and a variable frequency, the power transducer comprising:
a converter for rectifying an AC voltage of an AC power supply to convert it to a direct current (DC) voltage;
a DC intermediate circuit having a smoothing capacitor for smoothing a DC voltage of the converter;
a detecting circuit for detecting a voltage of the DC intermediate circuit;
a regenerative braking circuit disposed in the DC intermediate circuit;
a drive circuit for driving the regenerative braking circuit when the detecting circuit detects a specified voltage;
a timer for accumulating an operating time of the regenerative braking circuit to obtain a cumulative operating time; and
an inverter for converting the DC voltage of the converter to an AC voltage,
a nonvolatile memory for pre-storing correlation data between a generation loss of a power semiconductor in the regenerative braking circuit and a permissible duty factor of the power semiconductor from a resistance value set for the regenerative braking resistor connected to the regenerative braking circuit; and a display unit for displaying a permissible duty factor of a power semiconductor calculated or read from the nonvolatile memory, wherein a permissible duty factor and the resistance value of the regenerative braking resistor are individually set, wherein the power transducer reads from the nonvolatile memory permissible duty factor data of the power semiconductor corresponding to the resistance value set for the regenerative braking resistor, and wherein, if both the set permissible duty factor of a regenerative braking resistor and the stored permissible duty factor of the power semiconductor are 100% or more, it is determined that the regenerative braking circuit can continuously operate.

7. The power transducer according to claim 6, wherein the power transducer performs the steps of:

comparing the permissible duty factor of the regenerative braking resistor with the permissible duty factor of the power semiconductor obtained from the resistance value set for the regenerative braking resistor; and automatically disconnecting only the power semiconductor in the regenerative braking circuit without breaking the output of the power transducer when the cumulative operating time obtained by the timer reaches the permissible duty factor of the regenerative braking resistor or the permissible duty factor of the power semiconductor, whichever is smaller.

8. The power transducer according to claim 6, wherein, when the resistance value setting of the regenerative braking resistor is equal to or less than a predetermined minimum permissible resistance value, the permissible duty factor of a power semiconductor in the regenerative braking circuit is displayed on the display unit.

9. The power transducer according to claim 6, wherein, when the resistance value setting of the regenerative braking resistor is equal to or less than a predetermined minimum permissible resistance value, symbols or characters for indicating a resistance value setting failure are displayed on the display unit.

10. The power transducer given in claim 6, further comprising:

an operation panel which allows the operator to individually set the permissible duty factor and resistance value of the regenerative braking resistor.

\* \* \* \* \*